Dec. 2, 1952 W. H. KNOWLES, JR., ET AL 2,620,418

GANG VOLUME CONTROL BANK

Filed June 2, 1950 3 Sheets-Sheet 1

INVENTORS
William H. Knowles, Jr.
William B. Pegram
BY
Blair + Black
ATTORNEYS

Dec. 2, 1952 W. H. KNOWLES, JR., ET AL 2,620,418

GANG VOLUME CONTROL BANK

Filed June 2, 1950 3 Sheets-Sheet 2

INVENTORS
William H. Knowles, Jr.
William B. Pegram
BY
Blair + Black
ATTORNEYS

INVENTORS
William H. Knowles, Jr.
William B. Pegram
BY
Blair + Black
ATTORNEYS

Patented Dec. 2, 1952

2,620,418

UNITED STATES PATENT OFFICE 2,620,418

GANG VOLUME CONTROL BANK

William H. Knowles, Jr., Berwyn, and William B. Pegram, Swarthmore, Pa., assignors to International Resistance Company, Philadelphia, Pa.

Application June 2, 1950, Serial No. 165,648

10 Claims. (Cl. 201—48)

This invention relates to a variable resistor construction, and more particularly to an arrangement for mounting one or more variable resistor units as a group in a convenient, practical fashion to suit the needs of the individual set manufacturer.

In radio and television sets designed for reception, large numbers of variable resistors are used, this being an important cost item in their manufacture. Such variable resistors are frequently called "volume controls," whether or not they are used for the specific purpose of controlling volume. In the average set, several of these controls are situated for convenient manipulation and adjustment by the operator, but particularly in television, there are usually many more controls located in the rear of the chassis or hidden under a cover plate in the front of the chassis for initial adjustment during installation of the sets, but not to be adjusted during use of the set. This problem has become more acute recently, due to the marked popularity of television, which sets require many more of such controls, particularly of the type to be initially adjusted and not used by the operator of the set. At the present time, most television sets use standard volume control units only for adjustment of the installer and repair man mounted in a line on the rear portion of the chassis. Because such television sets require a number of such controls, such controls have become a very important cost item in manufacture, particularly in television sets. Furthermore, both radio and television sets of different makes have a variety of designs dictating the use of volume controls at various points in the chassis. In some sets they may be mounted vertically, while in other sets horizontally, still others require controls mounted in the center of the chassis or adjacent the sides. Because of the variety of arrangements used by set manufacturers, the controls utilized must be adaptable for placing in a variety of positions in the sets.

An object of this invention is to provide a mounting for a group of variable resistors in a single frame so that the frame may carry as many individual resistor units as are required at any particular section of the radio or television chassis, as dictated by the design of the set manufacturer.

Another object is to provide in such a construction provision for two or more types of adjustment, i. e., rotation of a contactor disk by way of the periphery of the disk or by means of a shaft extending from the center thereof.

A further object is to provide in such variable resistor construction a fine adjustment without the use of the usual knobs or other adjusting mechanism.

A further object is to provide in such a resistor construction, a definite torque resistance to rotation to maintain a desired setting upon completion of adjustment thereto.

A further object is to provide such a resistor construction wherein the number of individual parts is reduced to the minimum and wherein such parts are standard to thereby reduce manufacturing costs.

Another object is to provide in such variable resistor construction an assembly which reduces manufacturing operations to a minimum thereby to provide additional economies in manufacture.

Another object is to provide in such variable resistor construction, individual parts which may be cheaply manufactured on a mass production basis to achieve further economies and simplicity in manufacture.

A still further object is to provide such a resistor construction which may be easily adapted to suit the individual needs of a number of manufacturers having a variety of set designs.

It is a final object to provide a variable resistor construction which may be easily assembled into the sets by the manufacture thereof thereby reducing his costs of manufacture.

The invention accordingly consists in the features of construction, combinations of elements, arrangements of parts, and relation and order of each of the same to one or more of the others, all as will be illustratively described herein, and the scope of the application of which will be indicated in the following claims.

In the accompanying drawing in which is shown several of the various possible embodiments of this invention:

Similar reference characters refer to similar parts throughout the several views of the drawings.

Generally speaking, the invention comprises a support for a plurality of individual variable resistors so designed that the group may be conveniently mounted in a variety of positions in a radio chassis or the like. The individual variable resistor units comprise two parts shaped to interfit in radial relationship and designed to be mounted in the support, the support being of such design as to allow for any reasonable length to mount the desired number of variable resistor units to be used in any particular group.

More particularly, the invention comprises a channel-shaped supporting member having spaced longitudinal slots formed in one wall thereof, and a series of openings in the base portion of the support through which the contactor elements extend for purposes of adjustment, to be described in more detail hereinafter. The individual variable resistor units include base portions having substantially circular resistance strips secured to one flat surface thereof, as well as the usual terminal connections. The resistor units also include disk-shaped parts larger in diameter than the base portions, and having shafts extending from one surface thereof to fit through central openings in the base portions.

The disk-shaped parts carry spring contactors shaped to engage the resistance strips when assembled. The individual variable resistor units are assembled in the manner described above and then slipped into operating position in the channel-shaped support with the shafts extending from the slots in one side of the support. The other side of the support engages the rear surface of the disk-shaped parts and there is mechanical provision for releasably holding the resistor units in this position.

The peripheries of the disk-shaped parts extend through the openings in the bottom of the channel-shaped support; thus the disks may be adjusted by way of the shafts or by way of manipulation of the periphery of the disk adjacent such openings. It will be seen that such units may be made very cheaply in different sizes and lengths and containing different numbers of resistor units, all according to the manufacturer's needs. Also, such groups of variable resistors may be conveniently mounted in many positions in a radio chassis. For example, they may be mounted flatwise by securing the bottom of the support to a wall of the chassis or they may be mounted in substantially vertical position. They may be mounted so that the peripheries of the disk-shaped parts extend through a panel for easy manipulation by the operator of the radio or television set. On the other hand, they may be enclosed within the chassis in such position as to be adjusted by the installer of a television, but not to be manipulated by the operator of the set.

Figures 1, 2:
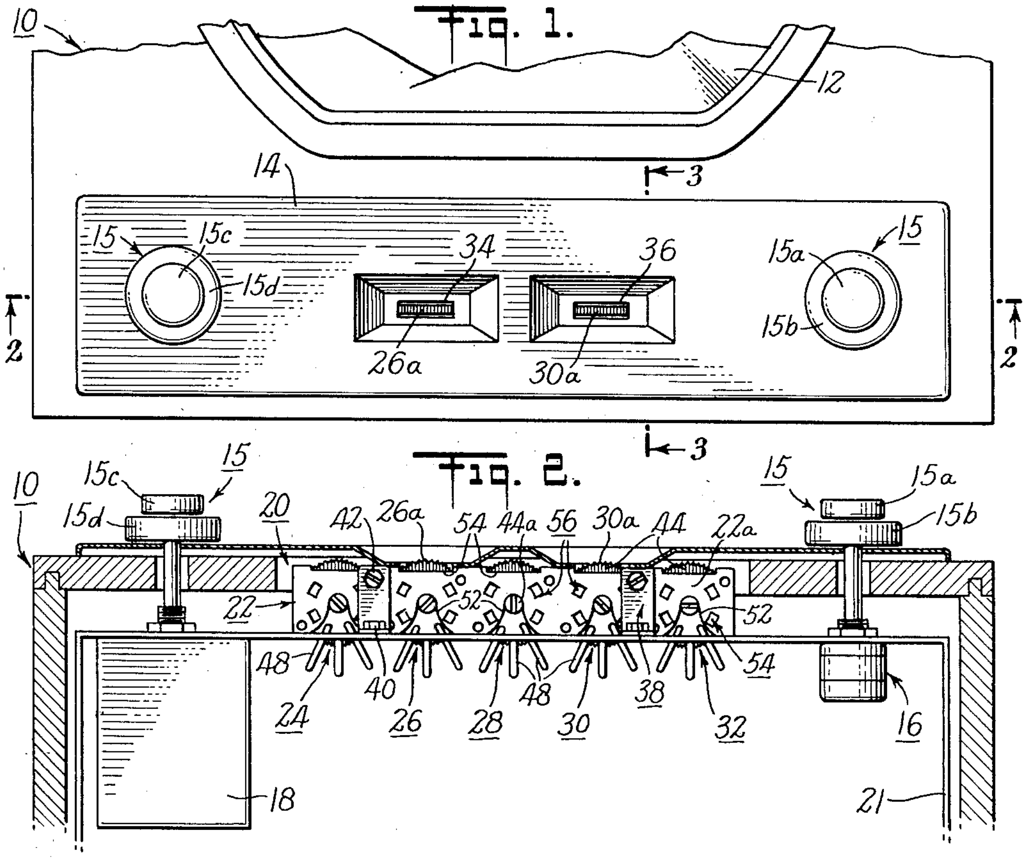
Figure 1 is a fragmentary front elevation of a portion of a television set having my variable resistor construction incorporated therein.
Figure 2 is a fragmentary horizontal sectional view, taken along the line 2—2 of Figure 1.

Referring now particularly to the drawings in Figure 1, there is shown a portion of the front panel 10 of a television set, including a screen 12. The panel 10 includes a control panel 14 having the usual knobs generally indicated at 15 located for rotational adjustment by the operator. As seen in Figure 2, one of the knobs 15 may comprise the parts 15*a* and 15*b* to adjust what is known as a concentric volume control generally indicated at 16 of standard construction. The other knob 15 may also include two sections 15*c* and 15*d* for adjustment of channel selector 18 or other apparatus found in a television set.

Figure 3:
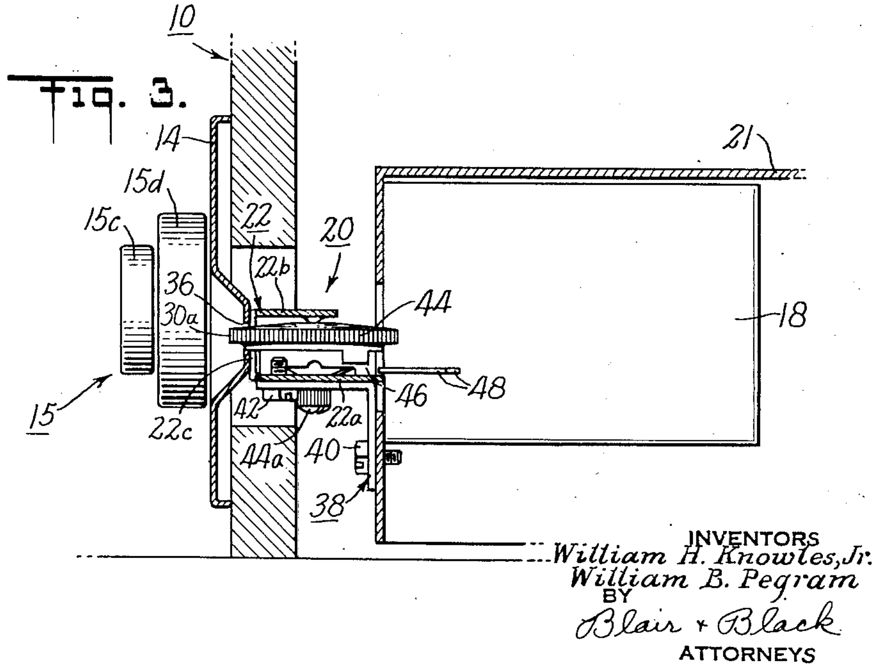
Figure 3 is a vertical sectional view taken along the line 3—3 of Figure 1.

As seen in Figure 2 a group of variable resistors generally indicated at 20 embodying the preferred form of my invention is mounted on the front of the chassis of the television set. As can be seen best in Figures 2 and 3, the group of variable resistor units 20 comprises a channel-shaped support generally indicated at 22, and a plurality of variable resistor units 24, 26, 28, 30 and 32. It should be understood that the number of individual resistor units in any particular group assembly may vary according to the design of the set in which they are to be incorporated. In this instance, five volume control units have been shown mounted as a group in the support 22 with the units 24, 28 and 32 adjustable only from within the chassis while the units 26 and 30 may be adjusted by the operator of the television set. This is accomplished by providing slots 34 and 36 (Figure 1) in the panel 14 the peripheries 26*a* and 30*a* of the contactor disks 26 and 30 extending through these slots so that they may be conveniently reached by the finger of the operator for adjustment. As noted above, the support 22 may be mounted in a variety of positions, but as shown in Figure 3, it is mounted in horizontal fashion by way of bracket members generally indicated at 38. Bracket members 38 may be secured to the chassis by way of screws 40 and similarly secured to the supports by way of screws 42, threaded into the side 22*a* of the support.

Inasmuch as all of the variable resistor units 24, 26, 28, 30 and 32 are intended to be substantially identical in construction, a brief description of the structure of one of these units will suffice for all, it being understood that the structural details will be described with greater particularity hereinafter. Referring to Figure 3, the resistor units comprise a disk-shaped contactor member 44, having a spring contactor (not shown) mounted therein, and a shaft 44*a* extending from the center thereof and preferably integral therewith. The resistor units also include a base portion 46 carrying a substantially circular resistance strip and collector ring (not shown) in engagement with the spring contactor, the shaft 44*a* of disk member 44 extending through a central opening in the base portion 46. Terminals 48 extend from the base portion and are electrically connected to the opposite ends of the resistance strip and to the spring contactor.

The support 22 for the variable resistor includes sides 22a and 22b which are preferably resilient in character and a bottom 22c. As shown in Figure 2, the side 22a of the support 22 includes slots 52 through which the shaft portions 44a extend. Also, as seen in Figures 2 and 3, the bottom portion 22c of the support includes openings 54 through which the disks 44 extend for purposes of adjustment. After the component parts of the individual resistor units are complete, they are assembled by threading the shafts 44a through the base portions. Then each unit is slipped into position between the sides 22a and 22b of the support 22 with the shafts 44a extending through the vertical slots 52. The group of variable resistors in the support 22 may then be mounted in the chassis in the manner described above or in any other suitable manner desired. As will be described in greater detail hereinafter, tabs generally indicated at 56 are formed in side 22a of the support which interfit with depressions formed in the bases 46 to releasably hold the resistor units in assembled relation.

It will now be seen that the individual resistor units are simple in structure and hence economical to manufacture. This is particularly so because the parts of each individual unit are standardized and thus may be made on a mass production basis. The support 22 may be manufactured in any desired length or it may be manufactured in standard lengths to be later severed into desired lengths to hold the number of resistor units ordered for any particular job. Furthermore, the set manufacturer is given great latitude in possibilities for individual design for the groups of variable units may not only be selected as to number desired, but may be mounted in a variety of positions which is particularly desirable where space is at a premium. Also, such groups of resistors may be arranged to be adjustable by the operator or positioned within the set for easy access by installers and repairmen.

In Figures 4 through 8, there is shown in detail an assembly comprising two variable resistor units as well as the structural details of one of the individual units. This assembly shown in these figures will now be described separately in order to bring out more clearly certain details which are not apparent from the above general description of the structure shown in Figures 1–3.

Figure 8:
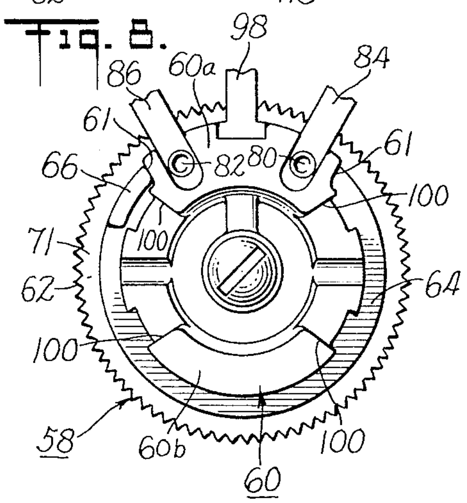
Figure 8 is a plan view of the base part and contactor disk shown in Figures 6 and 7 as assembled.

One of the variable resistor units is shown in Figure 8, and it includes a contactor disk generally indicated at 58 (Figure 6) and a base generally indicated at 60. The contactor disk 58 has a knurled periphery 62, an annular raised portion 64, a stop 66, and an integral shaft 68 having a slot 68a formed in the end thereof. An annular channel is thus formed between the raised portion 64, and the shaft 68 within which fits a spring contactor 72. Contactor 72 thus fits over shaft 68 and is provided with ears 72a and 72b, shaped to snap into slots 74 and 76 (Figure 4) extending through the disk 58. In this manner, the contactor 72 is held in the assembled position shown in Figure 6. Separate substantially annular contactor portions 72c and 72d are preferably formed integrally with the contactor and are bent upwardly away from the plane of the annular raised portion 64. The contactor portions also have small knobs 72c' and 72d' formed on their upper surfaces substantially in a radial line with respect to shaft 68 and located to engage the resistance strip in the base 60 in a manner to be later described; knob 72e is also formed on the contactor for engagement with the collector ring.

Figure 7:
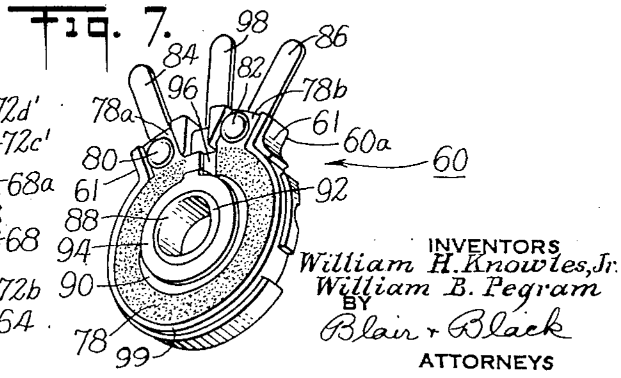
Figure 7 is a perspective view of the base part of the resistor construction shown in Figures 4 and 5.

The base 60, as shown in Figure 7, has on one surface thereof, a flat substantially circular resistance strip 78 secured thereto by way of rivets 80 and 82 extending through the projecting ends 78a and 78b of the resistance strip and an extension 61 of the base. The rivets 80 and 82 also secure terminals 84 and 86 to the base 60 and provide electrical connections with the opposite ends of the resistance strip 78. Surrounding the central opening 88 in the base 60 is a raised annular portion of the base 90, the raised annular portion 90 being separate from the opening 88 by an annular wall 92. An annular metallic collector ring generally indicated at 94 rests on annular portion 90, fitting over the annular wall 92. An extension 96 of the collector ring 94 is connected to a central terminal 98, suitably secured to the base 60. An annular peripheral flange 99 surrounds strip 78 locating it radially with respect to the base and extending above the exposed plane surface of the strip. From the above description, it will be seen that the base 60 and associated parts comprise a standard base portion of the usual volume control construction now in extensive use.

Figure 6:
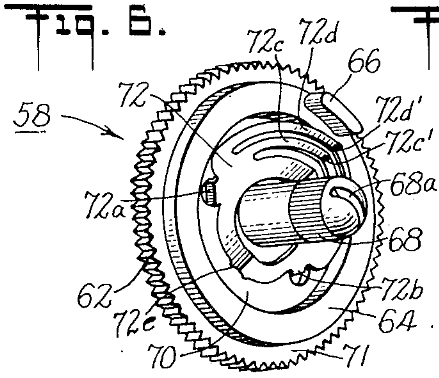
Figure 6 is a perspective view of the contactor disk forming a part of the construction shown in Figures 4 and 5.

Turning now to Figure 8, the rear portion of the base 60 is shown, which comprises a raised arcuate portion 60a adjacent extension 61 to which the terminals 84 and 86 are secured and a substantially similar raised portion 60b opposite thereto. Accordingly, portions 60a and 60b provide four shoulders 100 in this face of the base 60. The variable resistor units are assembled by fitting the shaft 68 through the central opening 88 of the base 60 in which position the contactor portions 72c and 72d and more particularly the knobs 72c' and 72d' will engage the resistance strip 78. It will be understood that the resistance strip may have any desired electrical characteristics to suit the particular conditions for which the unit is to be used. In this assembled position the contactor 72 (Figure 6) engages collector ring 94 (Figure 7) which is connected to terminal 98. As so assembled, the flange 99 on base 60 (Figure 7) abuts annular portion 64 of contactor disk 58 (Figure 7). In this position knobs 72c' and 72d' of contactor 72 are resiliently held in engagement with resistance strip 78 while knob 72e is similarly held against collector ring 94. The extension 61 of base 60 which supports the terminals 84, 86 and 98 is in the path of stop 66 on disk 71. Stop 66 is adjacent knobs 72c and 72d on contactor 72 as shown in Figure 6 and consequently the disk may be rotated to move the contactor to any point along the resistance strip 78. However, the contactor is prevented from riding over the ends of resistance strip by the stop 66 engaging the extension 61 at either end of the path of travel.

Figure 4:
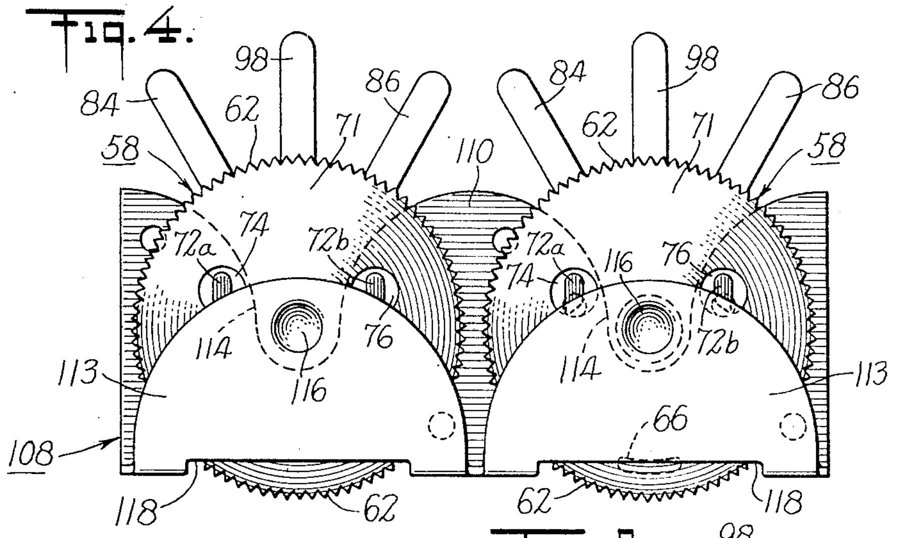
Figure 4 is a front elevation of the preferred embodiment of my variable resistor construction.
Figure 5:
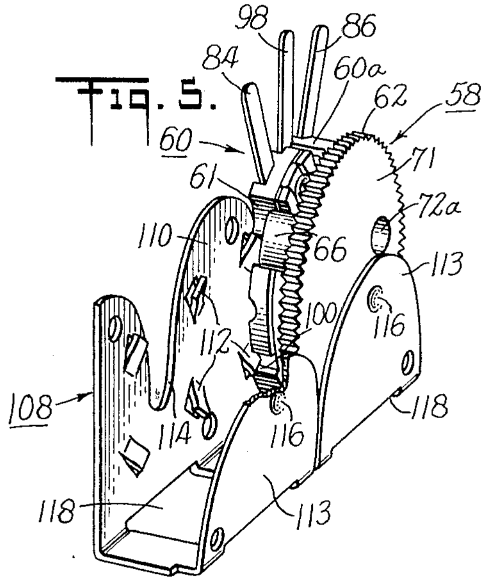
Figure 5 is a fragmentary perspective view of the construction shown in Figure 4.

The channel-shaped support generally indicated at 108 in Figures 4 and 5 supports the individual resistor units. The left-hand wall 110 of the support 108 as viewed in Figure 5, has formed therein a plurality of tabs 112 which extend inwardly. The wall 108 also has formed therein a series of substantially vertical slots 114. The other wall of the support comprises a plurality of substantially similar circular portions 113 each having an inwardly extending pimple 116 formed near the top portion thereof.

After the variable resistor units have been assembled, as described above, each unit may be inserted in the support 108 in the following manner: The shaft 68 is placed in the slot 114 so that the rear or exposed face of the base 60 (Figure 8) lies adjacent to wall portion 110 of the support 108. In this position, as shown in Figures 4 and 5, the exposed face of disk 71 lies adjacent one of the sections 114 of the support 108. The resistor unit is now pressed downwardly to snap into the position shown in Figures 4 and 5, in which position the tabs 112 abut the shoulders 100 to hold the unit in final assembled position. The wall portions 110 and 114 of support 108 are made individually resilient to allow the units to be snapped into final position in the above-described manner.

In final assembly position, the unit appears as shown in Figures 4 and 5 with terminals 84, 86 and 98 extending upwardly therefrom. A large portion of the knurled surface 62 of the disk 71 is exposed and another portion extends through openings 118 in the bottom of the support 108. The pimples formed in the portions 113 engage the central portions of the disks 71 forming a bearing surface therefore and holding the disks firmly in operative position against the bases so that the contactor 72 will engage the resistance strip 78 in the manner described above. Thus flange 99 on base 60 is held firmly against annular portion 64 of contactor disk 58 to provide a friction torque preventing unwanted rotation which might otherwise be caused by vibration, jars, etc. The disks 71 may be rotated by manipulation of the knurled portion or by way of the shaft 68. It will be noted that such adjustment may be made with a screwdriver by way of slot 68*a* formed in the shaft. Furthermore, the units may be readily inserted or removed from the support 108 without necessity for making any adjustments or removing any fastening elements. The variable resistor units may thus be assembled very rapidly and located in the support 108 to provide a group of variable resistor units of any desired length and number. It should be understood that while two variable resistor units are shown in the support 108 described in Figures 4 through 8, any desired number might be included by extending the support 108 to accommodate more resistor units all according to the purpose for which the group is manufactured.

Figures 9, 10:
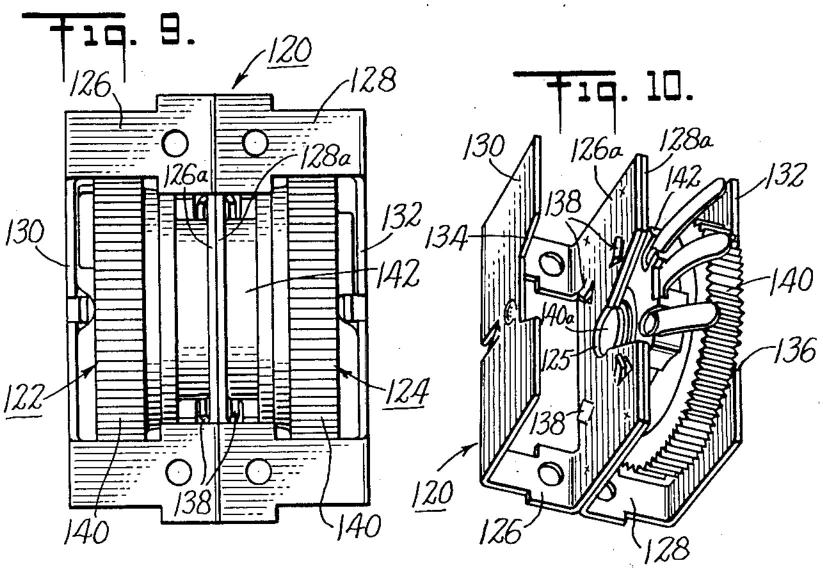
Figure 9 is an elevation of another embodiment of my invention showing two variable resistor units mounted together.
Figure 10 is a fragmentary perspective view of a portion of the structure shown in Figure 9.

In Figures 9 and 10, there is shown another embodiment of our invention in which there is a dual channel-shaped support generally indicated at 120 for supporting two variable resistor units generally indicated at 122 and 124 substantially similar in construction to the units described above. Referring to Figure 10, the support comprises channel-shaped members 126 and 128, the adjacent walls 126*a* and 128*a* of which are secured together in any suitable manner, as by spot welding. The outside walls 130 and 132 have slots 134 and 136 formed therein, while the inner walls have tabs 138 for a similar purpose and in a position similar to the tabs 112 shown in Figure 5. As shown in Figure 10, the disks 140 of the resistor units 122 and 124 have short shafts 140*a* which are of substantially the thickness of the base portions 142. Consequently, when the individual variable resistor units 122 and 124 are assembled, the shafts 140*a* only protrude a short distance beyond the bases to rest in arcuate openings 125 in walls 126*a* and 128*a*. When so assembled, the resistor units may be snapped into the channel-shaped members 126 and 128 of the support with the bases 142 face-to-face separated only by walls 126*a* and 128*a*. The tabs 138 act to hold the units in this position as described above. The construction shown in Figures 9 and 10 is particularly convenient where it is important to locate two variable resistors in a radio set adjacent each other. This some times becomes important where it is convenient to have the adjusting knobs of the controls located in close proximity. A control such as this might be substituted in many applications where dual controls with concentric shafts are now used.

Figure 11:
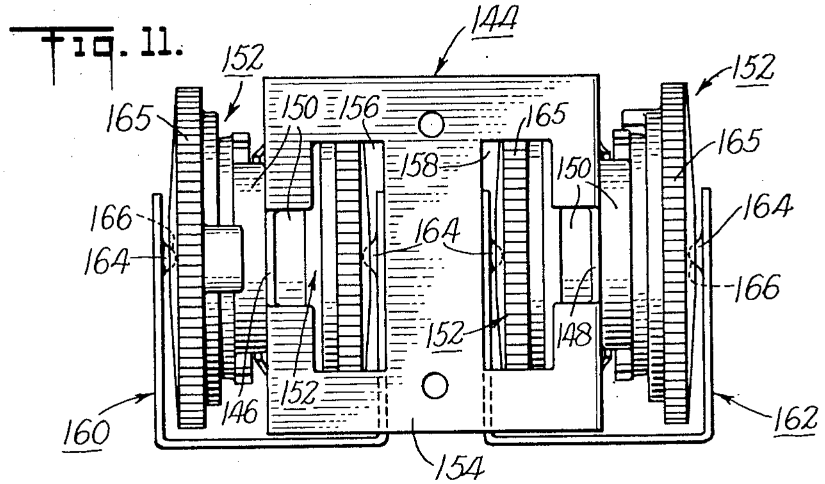
Figure 11 is a front elevation of another embodiment of my invention wherein two variable resistor units are mounted together.
Figure 12:
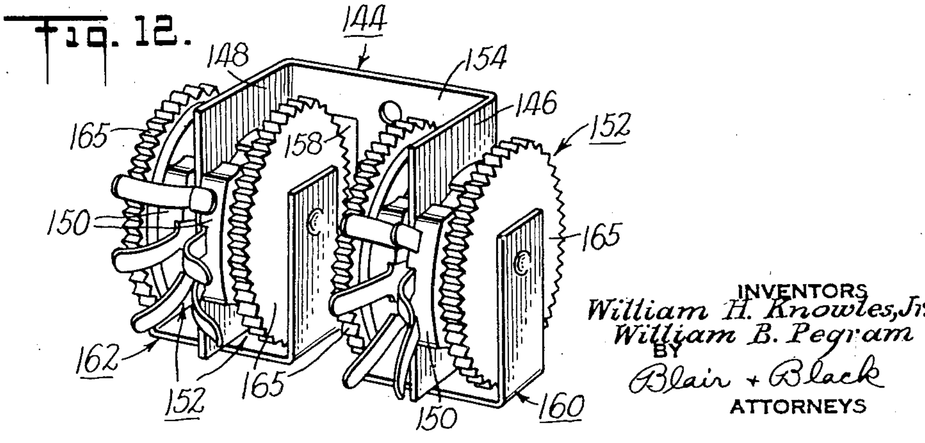
Figure 12 is a rear perspective view of the structure shown in Figure 11.

Another embodiment of my invention is shown in Figures 11 and 12 wherein an assembly is provided for holding two pairs of variable resistor units. A principal channel-shaped bracket 144 (Figure 11) forms the central support for the group of units and includes walls 146 and 148. Walls 146 and 148 are provided with the usual tabs (not shown) like tabs 138 (Figure 10) and 112 (Figure 5). Such tabs are formed at the appropriate points in the opposite sides of walls 146 and 148 to hold the four base portions 150 of the four variable resistor units generally indicated at 152 comprising the group in this structure. The variable resistor units 152 are substantially similar in construction to the units described previously and particularly with references to Figures 4–9.

As seen in Figure 11, the rear wall 154 of bracket 144 includes openings 156 and 158 substantially similar to the openings 118 (Figure 4) through which the peripheries of the contactor disks of the two inner resistor units extend for purposes of adjustment.

The resistor units are held in position as shown in Figures 11 and 12 by U-shaped clamps 160 and 162 provided with pimples 164 adapted to fit in corresponding depressions 166 at the central portions of the disks 165. Thus, when clamps 160 are snapped into position, about the assembled resistor units, the assembly is complete and the individual units may be adjusted by manipulating the knurled peripheries of the disk contactor 165.

Since many possible embodiments may be made of the mechanical features of the above invention, and since the art herein described may be varied in various parts, all without departing from the scope of the invention, it is to be understood that all matter hereinabove set forth, or shown in the accompanying drawings is to be interpreted as illustrative and not in a limiting sense.

What is claimed is:

1. In a variable resistor construction, the combination of a bracket substantially U-shaped in cross-section, two pairs of variable resistor units, each pair being mounted on said bracket with the units facing each other on the opposite sides of the walls thereof, and a pair of spring clips fitting over each of said pairs of units to hold said units in said position, said clips having projections formed thereon to engage the contactor disks of said units to form a bearing surface therefor.

2. In a variable resistor construction the combination of a base member, a resistance strip secured thereto, a relatively rotatable cover disk member, a contactor carried by said disk member, said members interfitting with said contactor engaging said resistance strip and the opposed faces of said members having complemental annular bearing surfaces adjacent their outer edges, and a channel-shaped supporting means having opposed wall portions resiliently engaging the outer faces of said members to hold them together and compress said annular bearing surfaces into frictional engagement.

3. In a variable resistor assembly a channel-shaped supporting means, a plurality of variable resistor units adapted to be mounted in said channel between the opposed walls thereof each unit comprising a base member carrying a resistance strip and a relatively rotatable contact carrying member, said members being arranged face to face with the said channel walls flexibly engaging the respective outer faces of the members to compress the units in assembled supported position, at least one of said walls being divided into segments corresponding to said units capable of being flexed substantially independently of each other whereby the respective units may be independently inserted or removed.

4. In a variable resistor construction, the combination of a base, an arc-shaped electrical resistance strip secured to said base, a disk, a contactor secured to said disk, said base and disk being constructed to fit face to face and with said contactor engaging said resistance strip for rotatable movement with respect thereto, and a combined support and clamping member substantially U-shaped in cross section the legs comprising spaced plate-like walls shaped to receive and hold between them said base and disk with the respective walls engaging the outer faces of said base and disk, at least one of said walls being resilient and the combined thickness of said disk and base when assembled being greater than the corresponding interior distance between said walls in relaxed condition so that said base and disk are held clamped together but with said disk free to be rotated to position selectively said contactor along said resistance strip.

5. In a variable resistor construction, the combination of a base, an arc-shaped electrical resistance strip secured to said base, a disk, a contactor secured to said disk, said base and disk being constructed to fit face to face with said disk relatively rotatable with respect to said base and said contactor slidably engaging said resistance strip, a clamping member substantially U-shaped in cross section having spaced legs receiving between them said base and disk with the respective legs engaging the outer faces of the said base and disk, and resiliently holding the base and disk in cooperative engagement the combined thickness of said disk and base when assembled being greater than the corresponding interior distance between said legs in relaxed condition so that said base and disk are held clamped together but with the disk free to be rotated, and interfitting formations between the outer face of said base and the corresponding leg of said clamping member to hold the base in position and against rotation.

6. In a variable resistor construction, the combination of a base member, an arc-shaped electrical resistance strip secured to said base member, a disk member, a contactor secured to said disk member, said members being constructed to fit face to face with said contactor engaging said resistance strip, and a combined support and clamping element substantially U-shaped in cross section having spaced legs constructed and shaped to hold resiliently between them said members with the respective legs engaging flatwise against the outer faces of the corresponding said members, and interfitting formations between one of said legs and the corresponding member to hold the members in position in the element but with said disk member free to be rotated, at least one of said legs being resilient and whereby said members are held clamped together in position but may be readily inserted or removed as a unit by flexing of said resilient leg.

7. In a variable resistor construction, the combination of a base, a substantially circular resistance strip secured to said base, a disk, a contactor secured to said disk, said base and said disk being mounted with said disk rotatable and said contactor engaging said resistance strip, and a clamping member substantially U-shaped in cross section with spaced legs arranged to extend around said base and disk and resiliently engage against the respective outer faces thereof to hold said disk and said base in said relationship, and said disk having a larger diameter than said base and knurled portions formed in the periphery thereof, said disk having a shaft extension at its center extending through said base and through the corresponding leg of said clamping member.

8. In a variable resistor construction, the combination of a base member, an arc-shaped electrical resistance strip secured to said base member, a disk member, a contactor secured to said disk member, said members arranged to fit face to face with said contactor engaging said resistance strip and with said disk member rotatable relative to said base member, and a combined support and clamping element substantially U-shaped in cross section with spaced walls and a connecting portion, said members being resiliently clamped together by and between said walls, said rotatable disk member having a knurled part extending through an opening in the connecting portion of said support and having a shaft extending through an opening in said base member and through the corresponding wall of said support providing alternative means of adjustment of the contactor.

9. In a chassis construction for radios and the like, a common support for a plurality of variable resistors said support comprising an elongated member substantially U-shaped in cross section with opposed wall portions, and a plurality of variable resistors mounted in said support between said wall portions, each comprising a base having a resistance strip supported thereon, and a contact carrying member arranged to fit face to face with said base and capable of relative movement selectively to position said contactor along said strip, said base and said contact carrying member when interfitted being thicker than the corresponding distance between said wall portions before assembly whereby each of said resistors is resiliently clamped by and between said opposed wall portions and the parts of the corresponding individual resistors maintained in assembled relation but each unit is releasable independently of the others.

10. In a variable resistor construction, the combination of a relatively long support substantially U-shaped in section transverse to the length with the legs forming opposed walls, one of said walls having a series of slots open at the edge and extending inwardly toward the part connecting the opposed walls, and a plurality of resistors mounted in said support between said walls each comprising a base having a resistance strip supported thereon, and a contact carrying member arranged to fit face to face with said base and capable of relative rotation selectively to position said contactor along said strip, and said member having a shaft extending through a hole in the corresponding base and through one of said slots in said supporting member, the walls of said support being arranged to clamp said units resiliently between them thereby to maintain the parts of individual resistors in assembled relation and releasably to hold the resistors in the support.

WILLIAM H. KNOWLES, Jr.
WILLIAM B. PEGRAM.

REFERENCES CITED

The following references are of record in the file of this patent:

UNITED STATES PATENTS

| Number | Name | Date |
|---|---|---|
| 1,351,443 | Robertson | Aug. 31, 1920 |
| 1,425,689 | Powell | Aug. 15, 1922 |
| 2,023,603 | Lodge | Dec. 10, 1935 |
| 2,078,487 | Fedor | Apr. 27, 1937 |
| 2,098,273 | Bradley et al. | Nov. 9, 1937 |
| 2,160,142 | Hathorn | May 30, 1939 |
| 2,415,858 | Youhouse | Feb. 18, 1947 |